Figure 1:
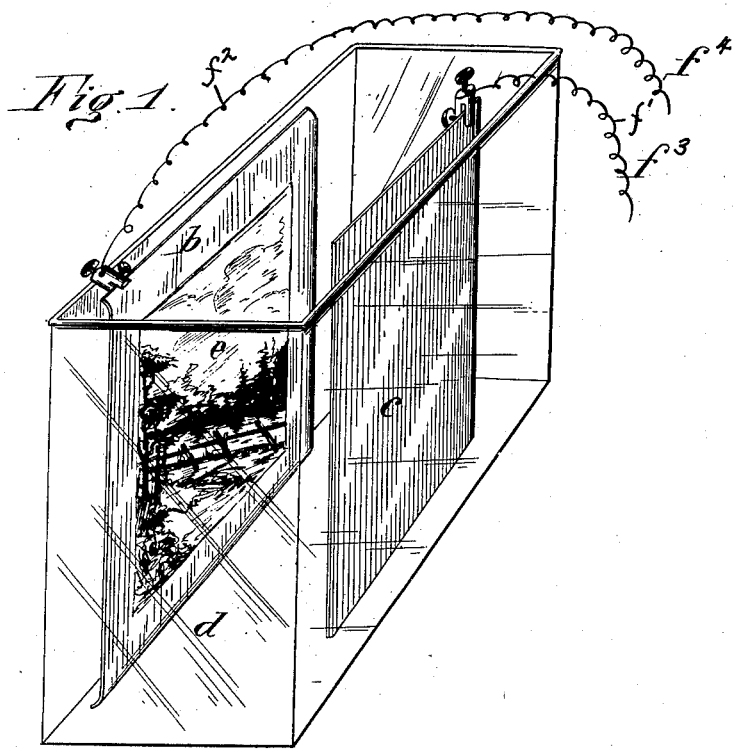

No. 737,882. PATENTED SEPT. 1, 1903.
O. C. STRECKER.
PROCESS OF ELECTROLYTICALLY PREPARING LITHOGRAPHIC PLATES.
APPLICATION FILED APR. 19, 1902.
NO MODEL.

Witnesses:
E. Hanusch.
L. Waldman.

Inventor:
Otto Carl Strecker
per B. Singer
Attorney.

No. 737,882. Patented September 1, 1903.

UNITED STATES PATENT OFFICE.

OTTO CARL STRECKER, OF DARMSTADT, GERMANY.

PROCESS OF ELECTROLYTICALLY PREPARING LITHOGRAPHIC PLATES.

SPECIFICATION forming part of Letters Patent No. 737,882, dated September 1, 1903.

Original application filed April 19, 1900, Serial No. 13,466. Divided and this application filed April 19, 1902. Serial No. 103,834. (No specimens.)

*To all whom it may concern:*

Be it known that I, OTTO CARL STRECKER, a subject of the German Emperor, and a resident of Darmstadt, Germany, have invented certain new and useful Improvements in Processes of Preparing Metals or Alloys for Lithographic Purposes, of which the following is a specification, this application being a division of my prior pending application, Serial No. 13,466, filed April 19, 1900.

Metal plates for printing purposes have been prepared hitherto by coating the plates with a layer of hygroscopic materials directly or by brushing, powdering, &c., in a mechanical way or by coating the plates with materials capable of forming such layers by chemical reactions with the metal of the plate.

My invention consists in employing electrolysis for the same purpose in such manner that the plate before or after transferring the drawing serves as an anode ($b$ electrode) and as an electrolyte the watery solution of a suitable substance or mixture of substances, by which process an insoluble layer is formed upon the plate which is either hygroscopic or may be changed into a hygroscopic layer by further processes. The desired effect may be obtained by using alternating current, as set forth in the specification, and treating the plates afterward with acidified gum or gum with other suitable substances.

Figure 2:
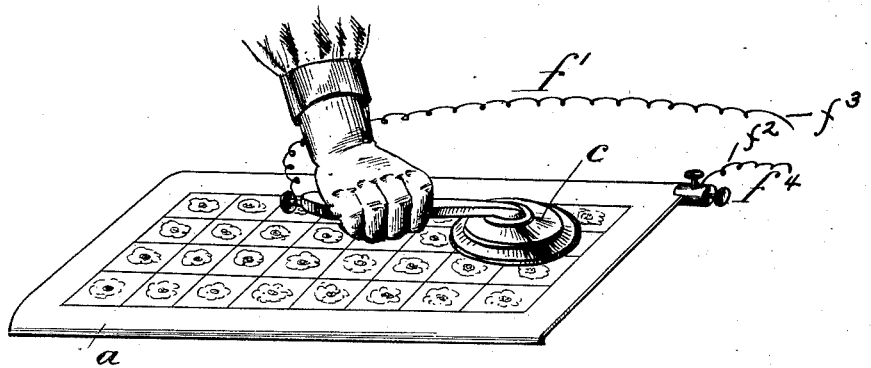

In the drawings, Figure 1 is perspective view illustrating the practice of my invention in connection with an electrolytic cell, and Fig. 2 a like view illustrating the use of a brush instead of a cell.

Since alternating currents are employed in the present process, there is, accurately speaking, neither anode nor cathode, and I shall therefore conventionally distinguish the electrodes as the $b$ electrode and the $c$ electrode.

In carrying out the process I may employ—

A. The method of dipping the plates explained by Fig. 1 of the drawings, in which $b$ is the $b$ electrode with the design, $c$ is the $c$ electrode, $d$ is the electrolyte, and $f'$ $f^2$ are the copper wires connecting $b$ and $c$ with the source of electric energy at $f^3$ and $f^4$, the machine not being shown. The plate (the $b$ electrode—about sixty-five to one hundred centimeters in thickness) provided with the lithographic drawing or transfer is completely dipped into the liquid except at the curved edge, which carries a screw-fastener for attaching the positive wire. The opposite electrode is connected in a similar way. Both plates stand up vertically in the vessel and must not touch each other.

B. The method of sponging the plates explained by Fig. 2 of the drawings, in which $a$ is the $b$ electrode with the design, $c'$ the $c$ electrode—to wit, the rotative plate with an insulated handle $c^2$, (the electrolyte is invisible on the plate)—and $f'$ and $f^2$ are the copper wires connecting $b$ and $c$ with the source of electric energy at $f^3$ and $f^4$, the electric machine not being shown. In this instance the plate provided with the drawing or transfer and constituting the $b$ electrode is brought to a horizontal position and connected to one side of a source of electric energy. Upon this $b$ electrode I pour liquid, while the opposite side of said source is brought into contact with the electrolyte by means of the $c$ electrode, consisting of the flat metal plate $c'$, provided with the insulated handle $c^2$. This metal plate is faced with a layer (four to five millimeters) of cotton and is passed over the horizontal $b$ electrode. The intensity of the alternating current applied is 0, 1 ampere to four inches square, which is the size of the $c$ electrode, and the duration is, according to the size of the printing-plate, five to ten minutes. The tension of the current does not exceed two volts generally, and the frequency is about fifty to sixty. The tension is of less importance and may be altered. The electrodes may consist of metals or alloys of such color, density, and chemical qualities as to allow their practical use. Preferably zinc and aluminium are used, but copper, nickel, and alloys of these with the former are useful. A metal plate of zinc is ground by means of a pad of felt and pumice powder in the manner hitherto in use for zinc and described elsewhere by my United States Patent No. 703,096. The metal is rinsed with water and then made dry and is ready for use. On this plate is fixed a lithographic design or transfer, the negative of the intended print. After this the plate is gummed with a solution of gum-arabic of medium strength, and this is made dry. After being perfectly dry the greasy substance is washed out by lithophin, a solution chiefly consisting of asphaltum in benzene or spirits of turpentine. The excess is wiped off, and the plate is then made dry. Then the gum-arabic is washed off the plate by water and the lithographic design is left on the plate as a layer of asphaltum. The design is properly rolled, and then the plate is cleaned from spots and the like. Alterations and corrections are done by lithographic ink after the method well known to printers, and the plate is ready for my process, in which it will be used as an electrode. The treatment of aluminium plates may be done in the same way with a similar result. The electrolyte in using the alternating current may consist of a solution of three per cent. of a neutral phosphate, sulfate, or the like. The passing of the alternating current causes on the printing-plate a layer insoluble in water, which, however, according to the nature of the metal employed, is either insoluble, as with aluminium, or soluble, as with zinc, in a solution of gum. The layers formed are to all probability the oxids or hydroxids of the metals employed. Furthermore, the formation of the layer having been effected in a neutral solution in order not to destroy the lithographic design on the plate it is evident that the character of the layer obtained will be either neutral or basic. In both cases it would be useless for printing purposes, as it would attract the color or ink instead of water and cause the printing-paper to grease up. Therefore such layers must be treated with an agent which will render them useful, and this may be obtained by weak acids, which, however, are not applicable in every case, or by other chemical agents—such as acid phosphate of ammonia, acid fluorid of ammonia, or silicofluorid of ammonia, or the like salts, whose acids will form insoluble salts with the metals employed, alone or in mixture with oxidizing means, such as nitrate of ammonia, or in mixture with weak acids, such as gum-arabic. By these secondary processes the layers are made fit for the lithographic printing. Some of them are altered in their chemical composition and will after the acidulation represent insoluble salts of the metals employed. Some layers only are acidulated, but all of them are insoluble and hygroscopic.

A zinc plate, treated as described hereinbefore, is subjected to the alternating current. The plate is rinsed properly with water and made dry. Then a solution of ninety-five parts of water, two parts of nitrate of ammonia, and three parts of acid phosphate of ammonium poured on, or an aluminium plate, treated as described hereinbefore, is subjected to the alternating current. The plate is rinsed properly with water, made dry and gummed. The gum is then removed by washing, and then the solution, consisting of ninety parts of water, six parts of gum, two parts of nitrate of ammonia, and two parts of silicofluorid of ammonia, is poured on it. In both cases the solution applied is then distributed by means of a fine hair brush and allowed to act upon the plate in the course of two to three minutes, while the solution is brushed frequently over the plate to cause it to improve and strengthen the layer. When the time of action for the chemical substances has passed, the remaining solution is washed off, the plate is made dry, and is then gummed.

Having now particularly described and ascertained my invention, what I claim, and desire to secure by Letters Patent, is—

1. The process for preparing metal plates or alloys for lithographic and printing purposes, consisting in submitting the plate, as one of a pair of electrodes, in electrical connection through a suitable electrolyte, to the action of an alternating current, by which a layer of oxids is formed on the metal, and then transforming said layer by chemical means into an insoluble layer of salts adhering firmly to the metal.

2. The process for preparing metal plates or alloys for lithographic and printing purposes, consisting in first submitting the plate, as one of a pair of electrodes, to the action of an alternating current in watery and neutral solutions of salts, whereby the current passing from the electrodes through the electrolyte, forms on the plate a layer adhering firmly to the plate and insoluble in water, and then transforming said neutral or basic layer by chemical means to suitable combinations for lithographic purposes and causing said layer to still adhere to the surface of the metal.

3. The process for preparing metallic lithographic and printing plates, consisting in preparing the plate by grinding, then suitably fixing thereon the figure to be printed, then submitting the plate as one of a pair of electrodes, having an electrolyte, to the action of an electric current, whereby the current forms on the plate an insoluble layer, and then submitting the plate to a chemical treatment by which this neutral or basic layer will be changed to an insoluble salt of the metal of which said plate is formed.

In testimony whereof I have hereunto set my hand in presence of two witnesses.

OTTO CARL STRECKER. [L. S.]

Witnesses:
HANS STRECKER,
WALTER HAUSING.